Jan. 27, 1942.  G. N. HANSON ET AL  2,270,875
GYRO VERTICAL AND AUTOMATIC PILOT FOR AIRCRAFT
Filed March 18, 1939  3 Sheets-Sheet 1
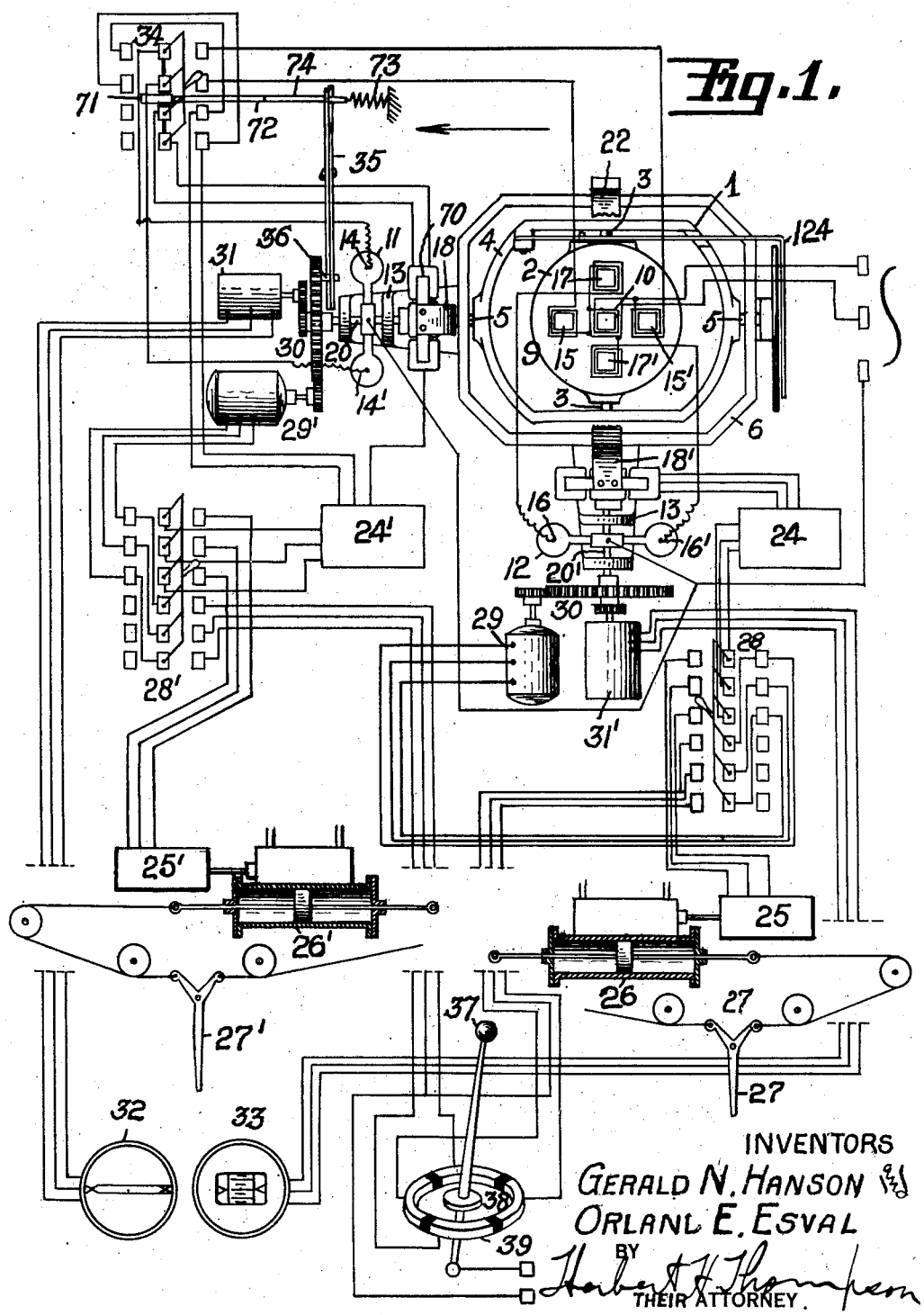
INVENTORS
GERALD N. HANSON
ORLAND E. ESVAL
BY
Herbert H. Thompson
THEIR ATTORNEY.

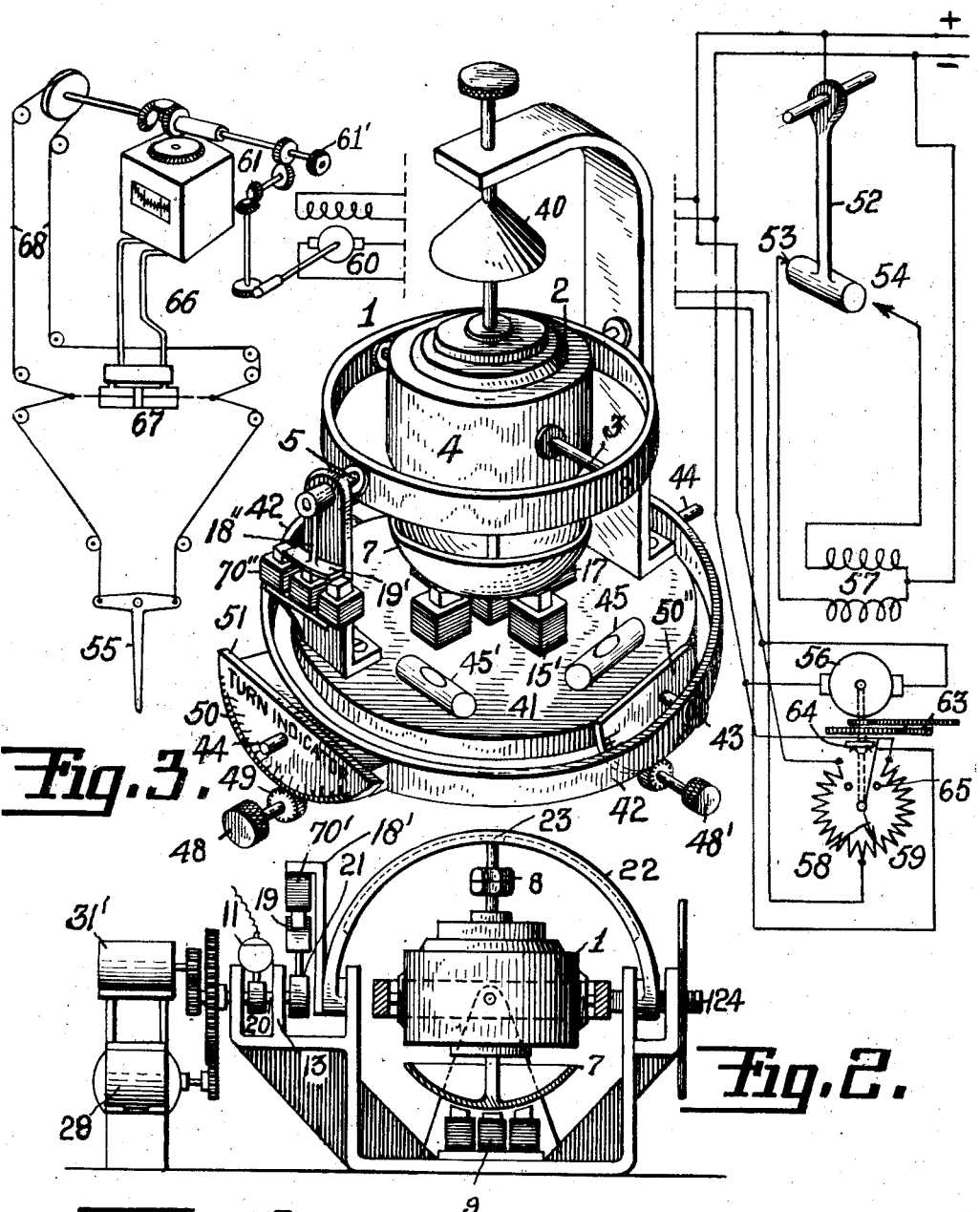

Jan. 27, 1942.   G. N. HANSON ET AL   2,270,875
GYRO VERTICAL AND AUTOMATIC PILOT FOR AIRCRAFT
Filed March 18, 1939   3 Sheets-Sheet 3
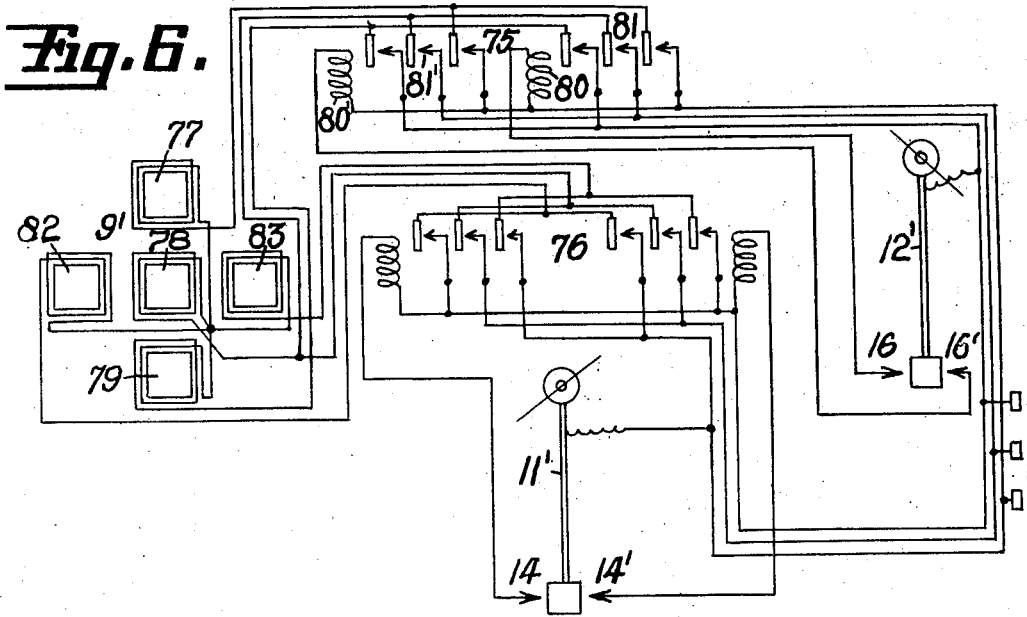
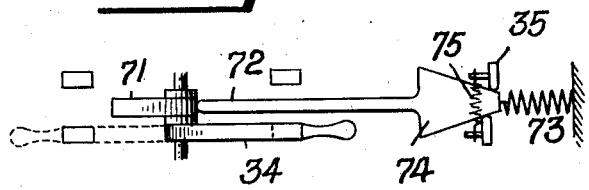
INVENTORS
GERALD N. HANSON
ORLAND E. ESVAL
BY Herbert H. Thompson
THEIR ATTORNEY.

Patented Jan. 27, 1942

2,270,875

UNITED STATES PATENT OFFICE 2,270,875

GYRO VERTICAL AND AUTOMATIC PILOT FOR AIRCRAFT

Gerald N. Hanson and Orland E. Esval, Allendale, N. J., assignors to Sperry Gyroscope Company, Inc., Brooklyn, N. Y., a corporation of New York Application March 18, 1939, Serial No. 262,648

23 Claims. (Cl. 244—76)

This invention relates to automatic pilots for aircraft. It has a special application to the provision of means for correcting errors due to turning of the craft. Such errors arise from several causes such as improper banking of the craft during turn; and the disturbing effect of centrifugal force during the turn on the base line gyroscopic instrument in the automatic pilot such as the gyroscopic horizon or gyro vertical.

In our invention, we have also improved upon the construction of the standard gyroscopic horizon by removing the gravitationally responsive element from the gyro itself, and controlling the gyro at a distance, preferably electrically, from the separated gravitationally responsive element or elements. This has the advantage that the pendulous device and/or the forces controlled thereby do not disturb the gyro during correctly banked turns, and offers two different systems of operation.

1. The control force on the gyro may be removed during turns thus eliminating disturbance regardless of the type of turn.

2. The control force on the gyro may be continued during a correctly banked turn without disturbing the gyro, since a pendulous control element will retain its position relative to the airship during such perfectly banked turn.

According to our design, also, the device is operative both when the gyroscopic horizon is used as the base line for an automatic pilot and when not so used, that is, when used as merely an indicator of the horizon for observation by the pilot.

With respect to automatic banking, it is recognized in the prior art of automatic pilots that a gyroscopic horizon alone does not cause banking at the correct angle, but on the other hand, tends to interfere with the turn by keeping the turn flat. We are aware that it has been proposed to meet this difficulty by employing a pendulous device for controlling the inclination of the plane during a turn either in conjunction with the gyroscopic horizon or independently. By our invention, we propose to use the same pendulous device both for erecting the gyroscope and for maintaining the proper banking angle by transferring the pick-off at the device from the erecting device to the automatic pilot. This has the further important advantage that the gyroscope remains undisturbed by the deflection of the pendulum during turns, even though incorrectly banked.

According to one form of our invention, however, we propose to attack the problem from a different angle and thereby gain certain advantages over prior systems in causing bank as soon as or even before the turn begins, while in the present systems, the automatic bank is not brought into operation until after the acceleration forces due to the turn have arisen.

According to this form of our invention, when it is desired to turn, the aviator causes the turn primarily, not by turning the rudder through the directional gyroscope but by deflecting the ailerons through displacing the pick-off, controlling the same at the horizon gyroscope. This results in an immediate bank of the craft and a consequent turn. If, however, the plane is not banked at the proper angle for the resulting turn or, stated in a different way, if the plane is not turning at the proper rate for the given angle of bank, an auxiliary pendulum will be deflected which, according to our invention, instead of changing the banking angle, effects a displacement of the rudder so as to give the airplane a proper rate of turn for the banking angle put in. Therefore, the rate of turn is determined by the banking angle set, and a setting knob at the ailerons may be graduated if desired as a rate of turn indicating device.

Referring to the drawings illustrating several forms our invention may assume,

Fig. 1 is a combined mechanical and wiring diagram showing one form of our invention.

Fig. 2 is a side elevation partly in section of the gyroscopic horizon therefor.

Fig. 3 is a perspective view showing a modified form of horizon adapted for control of banked turns, in combination with a wiring diagram showing the azimuth control used in connection therewith.

Fig. 4 is a side elevation, on a larger scale, of one of the liquid levels of Fig. 1.

Fig. 5 is a detail of the automatic centralizing means employed for the liquid level device in Fig. 1, which is used when the level is employed as a controller for the bank control of the automatic steering device.

Fig. 6 is a wiring diagram showing a modified form of the erection device of Fig. 1.

In Fig. 1, only the automatic controls for the elevator and ailerons are shown, it being understood that the usual azimuth control from the directional gyroscope is employed, such as indicated diagrammatically at 61, 66, 67 and 55 in Fig. 3. As the base line for controlling the elevator and ailerons, we employ a suitable form of gyroscopic horizon or gyro-vertical, the gyro proper being shown at 1. Such a gyroscope usually has a vertical spinning axis and is universally mounted as by means of pivoting the rotor bearing case 2 on axis 3—3 placed laterally on the craft in a gimbal ring 4, which, in turn, is pivoted longitudinally on axis 5—5 in the outer support 6. Such gyroscopes are usually mounted in neutral equilibrium, but are subject to gravitational control in order to correct for wander and to thus maintain the spin axis vertical.

The form of erecting device we prefer is electrical and resembles the form shown in Fig. 6 of the prior application of Orland E. Esval, one of the present joint inventors, and Carl A. Frische, now Patent No. 2,229,645, dated January 28, 1941, for Electromagnetic erecting means for gyroscopes. According to this system, there is mounted on either the gyro rotor casing or on a fixed part a cup or dome-shaped conductive member or inductor 7. In this case we have shown in Figs. 2 and 3 such a member secured to the bottom of the gyro case and counterbalanced by adjustable weight 8. The cooperating electromagnetic device 9 in this instance is carried by the instrument housing, the parts being in reverse relation from that shown in the aforesaid prior application. The device 9 comprises five poles arranged in the form of a cruciform with its two axes preferably lying in the same vertical planes with the respective axes 3—3 and 5—5. One phase of a polyphase supply is continuously supplied to the winding 10 on the central pole, while the windings on the four outer poles are of a different phase and are separately controlled from some form of gravitational controller such as levels or pendulums.

Preferably we mechanically divorce the gravitational control from the gyroscope so that no gravitationally responsive parts are mounted on the gyro case or have pick-offs therefor connected with the gyro case. As shown, we employ two gravitational controllers, one acting about each axis and each in the form of a mercury level 11, 12 mounted on a shaft 20 pivoted in a bracket 13 adjacent the gyroscope on an axis normally in line with one of the axes 3—3 or 5—5 of the gyroscope respectively, i. e., in line with the axes of the cruciform. In its normal position, the casing of the level is maintained parallel to the horizontal plane of the aircraft so that if the aircraft tilts, the mercury will run to the low side of the level and complete a circuit on that side with a live contact 14 or 14' in that end of the level. Each of said contacts is normally in circuit with one of the outside pole pieces, displaced 90° thereto. As shown, for instance, the contact point 14 is in circuit with a winding on pole piece 15, and the contact 14' with a winding on pole piece 15', while contact 16 is in circuit with the winding on pole piece 17 and contact 16' with the winding on pole piece 17'. The windings on the outside pole pieces are connected to a different phase of the polyphase supply from the windings on the inside pole piece, so that the current in the center pole winding is displaced in time phase from that of the other windings. Therefore, when one of the outside pole windings is energized, a moving field is produced passing between said outside pole winding and the central pole winding, that induces currents in the inductor 7 on the gyroscope, resulting in motor action causing a reaction or force on the gyroscope at right angles to the direction of tilt, thereby serving to precess the gyro back to the vertical in the shortest path.

The proper attitude of the airplane is maintained from suitable pick-offs on the two axes of the gyroscope. Thus, on major axis 5—5 we have shown an arm 18 mounted on the shaft 5 and carrying one part of an inductive pick-off. In Figs. 1 and 2, arm 18 carries the three wound poles 70 while in Fig. 3, arm 18" is shown as carrying the soft iron pole piece 19'. Directly under the same, on the same shaft 20 which supports the level 11 or 12 (Figs. 1 and 2), is mounted a bracket 21 carrying the other element of the inductive pick-off, i. e., the pole piece 19. Such a pick-off is well known in the art. See, for instance, the patent to Wittkuhns #1,921,983, dated August 8, 1933. On the other axis, the arm 18' carrying poles 70' is secured to a bail or loop 22 pivoted on base 6 on an axis normally in line with the axis 3—3, the bail being compelled to tilt with the gyro about said axis by pin and channel connection 23. The gyro horizon is shown as provided with the usual horizon bar indicator 124, which both pitches and tilts with the gyroscope to show roll and pitch in the manner well known in the art.

The inductive pick-off from each inductor controller is led through suitable amplifiers 24 and 24', and thence to an electromagnetic relay device 25 or 25' which controls the servo motor 26 and 26' operating the proper control surface 27 or 27' of the aircraft. In this case 27 represents the elevator and 27' the aileron control.

Preferably, however, we interpose between the amplifiers and the relays throw-over switches by which the automatic pilot may be disconnected, if desired. When such is done, however, an analysis of the problem will show that the gyroscopic horizon will not function properly with only the parts already described, since there is no tie-up between the mercury levels and the gyroscope as existed when the plane was being stabilized about both axes from the gyroscope. In order that the gyro horizon may continue to function, or in order that it may be employed without an automatic pilot, if desired, additional mechanism is shown as brought into action by the throw-over switches 28 and 28'. In their second position, the inductive pick-off on the gyroscope is transferred from the relays 25, 25' to follow-up motors 29, 29', which are connected as through reduction gears 30 to the shafts 20 and 20' of the respective levels. Therefore the level mounting will at all times be maintained parallel to the horizontal plane maintained by the gyroscope so that any tilt of this axis will be detected by the mercury level or gravitational device, the contacts 14 and 14' acting as a pick-off between its follow-up supporting shaft 20 and the mercury in the level. Any tilt of the level support will therefore be corrected by correcting the position of the gyroscope through the effect of the sweeping or moving magnetic field produced by electromagnetic device 9 on inductor 7. We therefore may operate horizon indicators from the motors 29, 29' as by connecting an electrical transmitter 31 or 31' to each, connected to repeater motors (not shown) in the banking indicator 32 and in the pitch indicator 33 respectively which may be mounted on the instrument board.

We prefer also to provide a means whereby the gravitational control of the gyro is temporarily severed during a turn. For this purpose there is shown a switch 34 which is normally in the left-hand position, so that the mercury contacts 14, 14' are in circuit with the windings on poles 15 and 15'. When it is desired to turn, the turn control knob 61' on the directional gyroscope is turned in the proper direction and at the same time the switch 34 is thrown to the right, thus severing the connection between the mercury level and the inductive controller 9 at the gyroscope. At this time also we prefer to place the ailerons under the control of the mercury level rather than under the control of the gyro itself, as otherwise the gyro tends to keep the plane horizontal during a turn causing side slipping and interfering with the turn. The mercury level, however, is quickly responsive to the turn and will put in the proper banking angle. Therefore, at this time the control of the relay 25' is transferred from the inductive pick-off 18—19 to the mercury level 11 by the same switch 34.

It may also be desirable at this time to centralize the mercury level with respect to the craft in order to insure that the proper banking angle is maintained. For this purpose there is shown a scissors linkage 35 which, when switch 34 is thrown to the right, closes on a pin 36 extending from the face of gear 30 so as to maintain said pin in the horizontal plane of the shaft 20. To this end, we provide a cam 71 operated from the switch arm 34 with which cooperates a cam pin 72 normally held against it by a spring 73. On the outer end of the cam pin is shown in Fig. 5 a wedge or cone 74, said cone extending between the two arms of the scissors 35. With the switch handle in the position shown in Fig. 5, the scissors are yieldingly held closed on a pin 36 by spring 75, but when the switch arm is thrown in the other position, the cam 71 moves the wedge 74 to the right, thus opening the scissors and freeing the gear 30 and thus freeing the shaft 20 on which the level is mounted for control from the motor 29'.

A simple means for changing the flight attitude of the airplane in automatic flight without severing the gyro control may be provided by means of a small joy stick 37 which carries a central contact 38, adapted to be brought into contact with any one of four live segments 39. These segments are connected to points on the two switches 28 and 28', which are closed when the automatic pilot is in operation. By operating this stick, it will be seen, either follow-up or servo motor 29 or 29' may be brought into operation at will, and the amount of change of the attitude of the plane depends on the length of time that the stick is maintained in contact with a segment.

Fig. 3 shows our improved gyroscopic horizon as employed in a somewhat different method of securing correctly banked turns. In this figure, the gyroscopic horizon is shown in perspective with a conical caging device 40 at the top. For the sake of simplicity, the follow-up system about both axes has been omitted and only the pick-off 19'—70'' about the tilt axis is shown. According to this modification, the platform 41 on which the entire gyroscope is mounted is also universally supported within an outer gimbal ring 42 on minor axis 43 and major axis 44, the latter being in a fixed support on the craft (not shown). Liquid levels 45 and 45' are shown on base 41, so that the platform may be exactly levelled. Since the pick-offs are between the gyroscope and the platform, it will be readily apparent that the control of the elevator and ailerons may be effected by tilting the platform about axis 43 or 44, respectively, which of course effects the relative adjustment of the two-part pick-offs.

As is well known in the airplane art, adjustment of the ailerons causes not only banking, but resultant turning of the craft due to the increased air resistance on the low side. Since in most types of airplanes it is desirable to start the bank as soon as, if not before, the turn starts, we prefer in this modification to initiate the turn by use of the ailerons, which of course primarily causes a bank. Therefore, skidding during the initial part of the turn is avoided. We therefore show a knob 48 for controlling the steering in azimuth as connected through a pinion 49 to teeth 50 on a gear segment 51 secured to the gimbal ring 42. When said knob is turned, therefore, the platform is tilted, resulting in both a bank and turn of the craft. If desired, the segment 51 may be graduated in rate of turn instead of degrees of bank. Knob 48', similar to 48, is shown for adjusting the angle of attack.

It does not necessarily follow, however, that the plane will turn at the proper rate for the banking angle set up. In other words, there may be side slipping either toward the center of the turn or away from the center due to improper banking for the prevailing rate of turn or, stating it a different way, due to the improper rate of turn for the angle of bank set up. We therefore provide an auxiliary gravitational device responsive to incorrect bank of the craft, (that is, to side slip) in this case shown as a pendulum 52 pivoted to swing across the craft. Such a pendulum will of course always lie normal to the virtual direction of gravity, that is, will always be normal to the correct angle of bank. Therefore, if the bank angle is incorrect, the pendulum will make contact with one or the other fixed contact 53 or 54. We prefer to adjust from said contacts the rudder 55 of the craft so that the correct rate of turn is set up for the prevailing banking angle. To this end we have shown the contacts connected to control a small reversible motor 56 as by being connected to the opposed field windings 57 thereon. Said motor is connected through large reduction gearing 63 and slip friction clutch 64 to an arm 58 of a potentiometer 59 which, in turn, is connected to control a small servo motor 60 at the directional gyroscope control box 61. In case the pendulum makes contact with one or the other of contacts 53 and 54, the potentiometer arm 58 starts to move away from its central position, thereby starting the motor 60 to cause a shift in the pick-off at the directional gyroscope, as well known in the art, to cause a turning of the rudder. The rate of turn of motor 60 is increased as long as contact is maintained between pendulum 52 and either contact 52 or 53, since motor 56 continues to run the potentiometer arm over until the pendulum is centered between contacts. Thus, the correct rudder turn rate is assured to correspond with the bank angle initially set in. Since the turn is properly banked, the pendulous erecting means shown as mercury levels 11, 12 in Fig. 1, may be rigidly connected to the airship and the erecting device 9 need not be disconnected from such pendulous erecting means during turns. Limit stops 65 may be provided thereon to hold the potentiometer in its highest safe speed position, clutch 64 at that time slipping.

In the embodiment shown in Fig. 3, the caging device 40 is shown as carried on the platform 41. The purpose of this is to enable the pilot to uncage the gyro with the airplane in any flight attitude, the gyro then being vertical. This he can do by tilting platform 41 to such a position that the banking indicator 50 and the dive and climb indicator 50' correspond to the ship's attitude. Under these conditions the platform 41 will be horizontal and the gyro will be vertical and may be uncaged.

The directional gyroscope 61 is shown as controlling the rudder 55 through the usual relay valve 66 and hydraulic servo cylinder and piston 67. This figure also shows follow-back connecting wires 68 from the servo piston to the directional gyroscope, as is common in the art, such follow-back connections having been omitted in connection with the horizon gyroscope in Fig. 1 for the sake of simplicity. Obviously, any other type of follow-back may be employed, if desired.

A different arrangement of the circuits of the gravitational controller is shown in Fig. 6. In this modification, relays 75 and 76 are interposed between the pendulum (or mercury level) controls, 14, 14', and 16, 16', and the coils of the precession device 9'. It is thus possible to energize all three poles of a given axis at the same time thereby obtaining more efficient action and making the system operable over a much wider angle of displacement between gyro and coils. Reversal of the direction of precession is obtained by reversing the phases of the power supply to the coils by energizing the relay controlled by the opposite control of the pendulum.

In this form, a three phase supply is necessary. When, for instance, the gyroscope tilts with respect to the pendulum 12' about the fore and aft axis, contact 16 will be made for tilt in one direction, exciting coil 80 and closing the three contacts 81 and thus exciting the poles 77, 78 and 79 with the first, second and third phase, say, of the supply, said poles of course being arranged in the cruciform in a plane normal to the plane of tilt. If, however, the pendulum completes the contact 16', the opposite relay coil 80' will be excited to close relay contacts 81' by which the poles will be excited in the reverse order, the central pole 78, however, being always excited, when any set of relay contacts is closed, by the same or middle phase. Similarly, the contacts 14, 14' on the pendulum 11' excite the coils 82, 78 and 83 with the three phases through the relay 76 in one direction or the other, depending on the direction of tilt. Thus the length of the path of flux flow is at least doubled, better motor action obtained, and the gyroscope will remain effective even when the cup 7 is beyond one of the poles.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic stabilizer for aircraft a neutrally mounted gyro vertical, separately mounted gravitational elements, pick-off means responsive to relative tilt of the craft and said gravitational elements for applying a torque on the gyro substantially at right angles to the tilt, pick-off means responsive to a relative tilt of the airplane and gyroscope for controlling servo motors for the elevator and ailerons to stabilize the craft, and means for transferring the control of the aileron servo motor from the gyro pick-off to the gravitational pick-off during turns.

2. In an automatic stabilizer for aircraft, a neutrally mounted gyro vertical, separately mounted gravitational elements, pick-off means responsive to relative tilt of the craft and said gravitational elements for applying a torque on the gyro substantially at right angles to the tilt, pick-off means responsive to a relative tilt of the airplane and gyroscope for controlling servo motors for the elevator and ailerons to stabilize the craft, a normally inoperative follow-up device adjacent the gyroscope for stabilizing one part of said first named pick-off means when the servo motors are inoperative, and means for placing said follow-up device under the control of said second pick-off when said servo motors are inoperative.

3. In a gyroscopic artificial horizon, a neutrally mounted gyroscope, electrical torque applying devices for erecting the same, separately mounted gravitational elements, follow-up devices cooperating with said gravitational elements, pick-offs on the gyroscope controlling said follow-up devices, and pick-offs between said gravitational and follow-up devices controlling said torque applying devices.

4. In a gyroscopic artificial horizon, a neutrally mounted universally supported gyroscope, a member comprising spaced pole pieces having A. C. windings for electrically producing a transversely moving magnetic field, a second member comprising a non-magnetic electrical conductor inductively associated with said first member, means connecting one of said members to said gyroscope, said other member being independently supported on a fixed part adjacent thereto, and a mechanically dissociated gravitational device for causing alternating current of one or the other phase relationship to flow through said windings upon relative tilt of the craft and gravitational device in one direction or the other whereby the resulting inductive reaction between said members serves to maintain the gyroscope vertical.

5. In a gyroscopic artificial horizon universally mounted in neutral equilibrium, a bolt-like conductor member mounted on said gyroscope, an inductively coupled fixed member mounted adjacent thereto and having five poles arranged in cruciform, said poles having polyphase windings thereon, and mechanically dissociated gravitational members for varying phase relations of said windings to vary the direction of the moving magnetic field in said conductor to exert a torque on the gyroscope about either horizontal axis to erect the same.

6. In an automatic pilot for aircraft, a gyro vertical for maintaining the craft horizontal during normal flight, a mechanically dissociated gravitational device for normally erecting said gyroscope to maintain it vertical, a controller normally operating between the gyroscope and craft for controlling the operation of the ailerons, and means for transferring the control of the ailerons from said gyroscopic controller to said gravitational device during turns.

7. An automatic steering device as claimed in claim 6, in which the control of said erection device from said gravitational device is likewise severed during turns.

8. Means for securing correctly banked turns in an automatic pilot for aircraft including a gyro vertical, comprising means for primarily deflecting the ailerons to set up a bank through said gyro vertical thereby causing a banked turn, means for detecting side slipping and means responsive thereto for adjusting the rate of turn of the craft until side slip is eliminated.

9. Means for securing correctly banked turns in an automatic pilot for aircraft including a gyro vertical, comprising means for primarily deflecting the ailerons to set up a bank through said gyro vertical thereby causing a banked turn, means for detecting side slipping and means responsive thereto for turning the rudder to eliminate said side slip by correcting the rate of turn.

10. An automatic banking device for aircraft automatic pilots as claimed in claim 9 in which said means comprises a gravitationally responsive or pendulous element, and motive means at the directional gyroscope governed thereby so constructed and arranged as to set up a rate of turn which slowly increases the longer the side slip persists.

11. A gyroscopic artificial horizon as claimed in claim 3 having transmitters actuated from said follow-up devices, and remotely located pitch and bank indicators operated from said transmitters.

12. In an automatic stabilizer for aircraft, a neutrally mounted gyro vertical, separately mounted gravitational elements, pick-off means responsive to relative tilt of the craft and said gravitational elements for applying a torque on the gyro substantially at right angles to the tilt, pick-off means responsive to a relative tilt of the airplane and gyroscope for controlling servo motors for the elevator and ailerons to stabilize the craft, and means for transferring the control of said aileron servo motors from said second named pick-off means to said first named pick-off means during turns.

13. In an automatic stabilizer for aircraft, a neutrally mounted gyro vertical, separately mounted gravitational elements, pick-off means responsive to relative tilt of the craft and said gravitational elements for applying a torque on the gyro substantially at right angles to the tilt, pick-off means responsive to a relative tilt of the airplane and gyroscope for controlling servo motors for the elevator and ailerons to stabilize the craft, and means for transferring the control of said aileron servo motors from said second named pick-off means to said first named pick-off means during turns, and for simultaneously severing the control of said torque applying means from said first named pick-off means.

14. In an automatic stabilizer for aircraft, a neutrally mounted gyro vertical, separately mounted gravitational elements, pick-off means responsive to relative tilt of the craft and said gravitational elements for applying a torque on the gyro substantially at right angles to the tilt, pick-off means responsive to a relative tilt of the airplane and gyroscope for controlling servo motors for the elevator and ailerons to stabilize the craft, servo motors for stabilizing from said gyroscope both said gravitational elements when the automatic stabilizer is not operating, and a manual controller for operating said motors at will to change the attitude of the craft when the automatic stabilizer is in operation.

15. In a gyro-vertical, a gyroscope including a rotor casing having means for supporting the same on horizontal axes in substantially neutral equilibrium, a conducting member carried by said casing, a fixed stator comprising a plurality of wound poles arranged in a cruciform, a polyphase supply, means responsive to tilt in one direction of the spin axis in the plane of one leg of the cruciform for exciting the respective windings of the poles of the leg normal thereto with the three respective phases of the supply and for tilt in the opposite direction with the phase order reversed, and means responsive to tilt in the plane of the other leg for similarly exciting the respective pole windings in the first named leg.

16. In an automatic pilot for aircraft, a support or platform universally mounted on said craft, a gyroscope independently universally mounted on said platform in neutral equilibrium, a pick-off between said gyroscope and platform for controlling the lateral inclination of the plane, and means for tilting said platform to bank the plane.

17. An automatic pilot as claimed in claim 16, having additional means for detecting side slipping of the plane when banked, and means responsive thereto for turning the rudder to cause the plane to turn at the proper angle for the angle of bank.

18. In a three degree of freedom gyroscope, a gyroscope including a rotor casing having means for universally supporting the same in substantially neutral equilibrium, a conducting member carried by said casing, a fixed stator comprising three wound poles arranged in line, a three-phase supply, means for exciting the three windings of said poles with respective phases of said supply for applying a torque on said gyro in one direction, and means including a relay for exciting said three windings with the phase order reversed for exerting a torque on said gyro in the opposite direction.

19. Means for securing correctly banked turns in an automatic pilot for aircraft including a gyro vertical, comprising means for primarily deflecting the ailerons to set up a bank through said gyro vertical thereby causing a banked turn, means for detecting side slipping, and means responsive thereto for adjusting the rate of turn of the craft to eliminate side slip.

20. In an automatic pilot for aircraft, a course maintaining means for maintaining a straight course, a rudder servo motor controlled therefrom, a course change means associated with said course maintaining means, variable speed motive means for turning said course change means, a speed control means for said motive means to govern the rate of turn of the craft, means for banking the craft and thereby cause a turn, and means responsive to lateral acceleration or side slip for adjusting said speed control means, whereby the correct banking angle is maintained by adjusting the rate of turn of the craft.

21. In a gyro-vertical, the combination with a gyroscope universally supported about horizontal axes in substantially neutral equilibrium, a torque applying device for applying an erecting torque to the gyroscope about one of said axes, a separately mounted gravitationally responsive device, a follow-up device cooperating with said gravitational device, a pick-off between said gyroscope and follow-up device, a servo motor operated from said pick-off for positioning said follow-up device, and a pick-off between said gravitational and follow-up devices for controlling said torque applying device.

22. In a gyro-vertical, the combination with a gyroscope universally supported about horizontal axes in substantially neutral equilibrium, a torque applying device for applying an erecting torque to the gyroscope about one of said axes, a separately mounted gravitationally responsive device, a follow-up device cooperating with said gravitational device, a pick-off between said gyroscope and follow-up device, a servo motor operated from said pick-off for positioning said follow-up device, a pick-off between said gravitational and follow-up devices for controlling said torque applying device, and means for rendering the control of said torque applying device from said gravitational device temporarily ineffective.

23. In a gyro-vertical for aircraft, the combination with a gyroscope universally supported about horizontal axes in substantially neutral equilibrium, a torque applying device for applying an erecting torque to the gyroscope about one of said axes, a separately mounted gravitationally responsive device, a follow-up device cooperating with said gravitational device, a pick-off between said gyroscope and follow-up device, a servo motor operated from said pick-off for positioning said follow-up device, a second servo motor for operating an attitude control surface of the aircraft, a pick-off between said gravitational and follow-up devices for controlling said torque applying device, and means for severing the control of the follow-up servo motor from said follow-up pick-off and causing said pick-off to control said second servo motor.

GERALD N. HANSON.
ORLAND E. ESVAL.